(12) United States Patent
Schmode et al.

(10) Patent No.: US 7,735,228 B2
(45) Date of Patent: Jun. 15, 2010

(54) INSULATION STRIPPING TOOL

(75) Inventors: Hartmut Schmode, Blomberg (DE); Andreas Wedler, Detmold (DE); Detlev Hetland, Detmold (DE); Bernd David, Detmold (DE); Detlev Klaas, Nieheim (DE); Ernst-Heinrich Scheel, Hameln (DE); John Witt, Detmold (DE); Werner Bachmann, Spenge (DE); Carsten Drescher, Detmold (DE); Günter Lucht, Horn-Bad Meinberg (DE)

(73) Assignee: Weidmueller Interface GmbH & Co. KG, Detmold (DE)

( * ) Notice: Subject to any disclaimer, the term of this patent is extended or adjusted under 35 U.S.C. 154(b) by 268 days.

(21) Appl. No.: 11/702,407

(22) Filed: Feb. 5, 2007

(65) Prior Publication Data

US 2007/0199197 A1  Aug. 30, 2007

(30) Foreign Application Priority Data

Feb. 7, 2006  (DE) .................. 20 2006 002 004 U

(51) Int. Cl.
    *B21F 13/00*  (2006.01)
    *B26B 29/06*  (2006.01)
(52) U.S. Cl. ........................................ 30/90.7; 30/90.1
(58) Field of Classification Search .................. 30/90.1, 30/90.4, 90.7, 90.2, 90.3, 91.1, 91.2; 269/2; 81/9.4, 9.41, 9.42, 9.43
    See application file for complete search history.

(56) References Cited

U.S. PATENT DOCUMENTS

| | | | | |
|---|---|---|---|---|
| 579,601 A | * | 3/1897 | Neuenschwander | 269/2 |
| 632,915 A | * | 9/1899 | Comfort | 269/2 |
| 2,924,130 A | * | 2/1960 | Reynolds | 408/118 |
| 3,129,000 A | * | 4/1964 | Casson | 269/2 |
| 3,423,835 A | * | 1/1969 | Mattern | 433/139 |
| 3,813,966 A | * | 6/1974 | Knuth | 30/91.1 |
| 3,965,571 A | * | 6/1976 | Lyman | 30/90.2 |
| 4,081,871 A | * | 4/1978 | Knuth | 7/107 |
| 4,096,631 A | * | 6/1978 | Ward | 30/294 |
| 4,685,366 A | * | 8/1987 | Beder | 83/455 |
| 4,732,069 A | * | 3/1988 | Wood et al. | 83/881 |

(Continued)

FOREIGN PATENT DOCUMENTS

DE 101 45 009 C1 4/2003

(Continued)

*Primary Examiner*—Kenneth E. Peterson
*Assistant Examiner*—Sean Michalski
(74) *Attorney, Agent, or Firm*—Lawrence E. Laubscher, Sr.; Lawrence E. Laubscher, Jr.

(57) ABSTRACT

An insulation stripping tool for flat cables includes a clamping device adapted to be clamped to a flat cable and to provide a linear guide edge for guiding a knife holder to accurately sever the outer insulation sheath of the cable in a transverse direction. Upon removal of the clamping device from the cable, the knife holder is inserted into a chamber contained in the clamping device with the knife edge protruding from the chamber, whereupon a curved side of the flat cable is inserted within first guide grooves contained in the clamping device, and the clamping device is displaced circumferentially of the cable to sever the curved cable side transversely of the cable. The curved cable side is then inserted into a second pair of grooves contained in the clamping device, and the knife holder is displaced longitudinally to sever the insulation sheath longitudinally of the cable.

8 Claims, 14 Drawing Sheets

U.S. PATENT DOCUMENTS

| | | | | |
|---|---|---|---|---|
| 4,920,495 | A * | 4/1990 | Pilkington | 700/195 |
| 5,069,097 | A * | 12/1991 | Mori | 83/56 |
| 5,381,601 | A | 1/1995 | Danter | |
| 5,400,941 | A | 3/1995 | Schmode | |
| 5,724,870 | A | 3/1998 | Wiebe | |
| 5,945,634 | A * | 8/1999 | Shimirak et al. | 174/71 C |
| 5,996,459 | A * | 12/1999 | Cornell et al. | 83/485 |
| 6,098,515 | A * | 8/2000 | Daley, Jr. | 83/485 |
| 6,226,873 | B1 * | 5/2001 | Okumura | 30/162 |
| 6,895,836 | B2 | 5/2005 | Hetland | |
| 7,096,760 | B2 | 8/2006 | Schmode | |
| 2002/0040632 | A1 * | 4/2002 | Beltrandi | 83/879 |
| 2002/0112586 | A1 * | 8/2002 | Mori et al. | 83/563 |
| 2004/0149108 | A1 * | 8/2004 | McLean et al. | 83/614 |
| 2005/0284278 | A1 * | 12/2005 | Shimizu et al. | 83/614 |
| 2006/0053996 | A1 * | 3/2006 | Sobel et al. | 83/614 |

FOREIGN PATENT DOCUMENTS

DE  10 2004 012 152 A1  5/2005

* cited by examiner

INSULATION STRIPPING TOOL

BACKGROUND OF THE INVENTION

1. Field of the Invention

An insulation stripping tool for flat cables includes a clamping device adapted to be clamped to a flat cable and to provide a linear guide edge for guiding a knife holder to accurately sever the outer insulation sheath of the cable in a transverse direction. Upon removal of the clamping device from the cable, the knife holder is inserted into a chamber contained in the clamping device with the knife edge protruding from the chamber, whereupon a curved side of the flat cable is inserted within first guide grooves contained in the clamping device, and the clamping device is displaced circumferentially of the cable to sever the curved cable side transversely of the cable. The curved cable side is then inserted into a second pair of grooves contained in the clamping device, and the knife holder is displaced longitudinally to sever the insulation sheath longitudinally of the cable.

2. Description of Related Art

Various proposals have been made in the prior art to strip the insulation from cables, as shown, for example, by the patents to Danter et al U.S. Pat. No. 5,381,601, Schmode et al U.S. Pat. Nos. 5,572,911 and 7,096,760, Wiebe et al U.S. Pat. No. 5,724,870, and Hetlund et al U.S. Pat. No. 6,895,836, among others.

A flat cable, as a rule, has several insulated conductors surrounded by an outer sheath of insulating material embedding the conductors along with their insulation. Owing to its configuration, the stripping of insulation from a flat cable is more difficult and complicated than for a round cable.

When making an electrical installation, it may be required to remove the outer sheath for a certain segment along the flat cable in order, for example, to make a branch connection To remove this segment of the sheath, one uses a knife in order to provide the sheath with two cuts that are apart from each other and that extend laterally with respect to the conductors. This method is rather laborious and also time consuming. Here is yet another disadvantage: The conductors and/or their insulation layers are relatively easily damaged. It is furthermore extremely difficult to remove the sheath to make a branch connection on an already-installed flat cable.

The present invention was developed to provide a stripping tool by means of which one can more easily remove a certain segment of the outer insulating sheath, especially also on an already-installed flat cable. Moreover, the idea is to make sure that the sheath will of course be cut through fully, but that the insulation covering of the conductors will not be damaged.

SUMMARY OF THE INVENTION

Accordingly, a primary object of the present invention is to provide an insulation stripping tool for flat cables including a clamping device that is adapted to be clamped to a flat cable and to provide a linear guide edge for guiding a knife holder to accurately sever the outer insulation sheath of the cable in a transverse direction.

The stripping tool has a clamping element that can be fixed upon a flat cable and a knife holder that is provided with a cutting knife, whereby the clamping element is made as a guide and as a seat for the knife holder.

The stripping tool thus supplies not only the knife function as such but also a kind of template function for cuts that are to be done.

The knife holder is so designed that, using the cutting knife, the outer sheath layer is cut through neatly so that the particular segment of the sheath, as a rule, can be pulled out without any retouching or any additional tearing from the conductors. Precise cuts can be assured because, in some of the cuts, it additionally serves as a guide for the knife holder.

A simple design results when the clamping element is made in the shape of a clip and when it has two clamping jaws that are connected with each other in an articulated fashion. The clamping jaws are open for the purpose of inserting the cable. As a result of the spring action, the flat cable is then fixed between the two clamping jaws.

According to a further object of the invention, upon removal of the clamping device from the cable, the knife holder is inserted into a chamber contained in the clamping device with the knife edge protruding from the chamber, whereupon a curved side of the flat cable is inserted within first guide grooves contained in the clamping device, and the clamping device is displaced circumferentially of the cable, thereby to sever the curved cable side transversely of the cable. The curved cable side is then inserted into a second pair of grooves contained in the clamping device, and the knife holder is displaced longitudinally to sever the insulation sheath longitudinally of the cable.

To make it possible to keep the stripping tool in a space-saving manner when it is not in use, it is provided that the internal contours of the connected clamping jaws define a cavity into which one can insert the knife holder and in which it can be stored.

The handling of the stripping tool when doing the cuts is particularly favored when the clamping jaws have mutually corresponding guide bores that extend along the longitudinal directions of the clamping jaws in which the area, adjoining the cutting knife, can be moved laterally with respect to the conductors in order to make cuts. Provided the opposite cuts are always cut by shifting the knife holder into the sheath, the two cuts will lie without any offset with respect to each other.

To make sure that the knife holder is guided not only in the cutting direction by the guide bore edges but also with regard to the depth to which the cutting knife dips into the sheath, it is provided that the guide bores are surrounded by counterbores or recesses with dimensions that are larger when compared to the guide bores, so that the edges, bordering on the grooves, will form contact support surfaces for the knife holder. In this way, one can prevent the insulation layers of the conductors from being cut by the knife blade. The counterbores are provided on the outer sides of the clamping jaws that face away from each other.

To make sure that the knife holder can always be arranged exactly with respect to the clamping jaw, it is provided that the knife holder in the terminal area containing the cutting knife displays a guide lug or projection so that the resultant surfaces will abut against the edges that limit the groove. The guide lug is so shaped that it can be moved in a closing manner inside the groove.

The cut depth can be adjusted in an extremely accurate fashion in the flat cables that are to be worked. To make sure that this can be done exactly in the simplest possible way, it is provided that the knife holder includes means for adjusting the depth of the cut. That device can be equipped with a sliding element that receives the cutting knife is inserted in a tubular support member which is equipped with a snap ring groove in which a safety pin extends to prevent axial displacement of the tubular support member in its housing. Furthermore, a spiral groove is provided in the holding tube in which engages a pin that passes through boreholes in the sliding element and the cutting knife. To make sure that the holding tube can be turned without any tool and without any major effort, it is provided that a handle be fixed on the end opposite the cutting knife. In a preferred version, this handle is a rotary knob that protrudes opposite the front surface of the knife holder. To make sure that the cutting depth will not change automatically, it is provided that the holding tube be secured against rotation by means of a set screw. In a preferred version, this set screw is a threaded bolt. The set screw must first be loosened so that the threaded bolt can be turned.

The clamping jaws have a U-shaped cross-section, whereby the lateral edges have recesses that extend from one front end to the opposite front end but that end at an interval from the latter. In that way, one forms a pouch in which one can insert the flat cable that is to be worked. The recesses are so chosen that the flat hole can be clamped for processing. The recesses end at an interval with respect to the preceding front end of the clamping element; therefore, a stop is formed upon which rests the longitudinal edge of the flat cable so that the latter will always be exactly positioned. The edges of the clamping jaws that limit the recesses can be provided with protruding teeth that dig into the sheath so that the flat cable is accordingly fixed in a form-locking manner.

While the guide bores of the clamping jaws during the performance of the cuts laterally with respect to the conductors of the flat cable form the guidance for the knife holder for the purpose of making a longitudinal cut, the knife holder is inserted into the cavity that is limited by the opposite clamping jaws. The same applies to the completion of the cross-sections around the lateral areas of the flat cable.

To make sure that the clamping element will form a guide when these cuts are made, it is provided that the clamping element on the front end area opposite the pouch for the clamping of the inserted flat cable has a plurality of V-shaped or semicircular recesses into which one can insert the longitudinal edge of the sheath.

The stripping tool of the present invention can be made as a manually operated tool consisting only of a few individual parts so that it can be made in a favorable fashion. It thus facilitates fast and unproblematic stripping of a flat band cable such as one would expect only of a far more complicated tool.

BRIEF DESCRIPTION OF THE DRAWINGS

Other objects and advantages of the invention will become apparent from a study of the following specification, when viewed in the light of the accompanying drawing, in which:

FIG. 4a is a schematic representation of the spring biasing means of the clamping means;

DETAILED DESCRIPTION OF THE INVENTION

Figure 1:
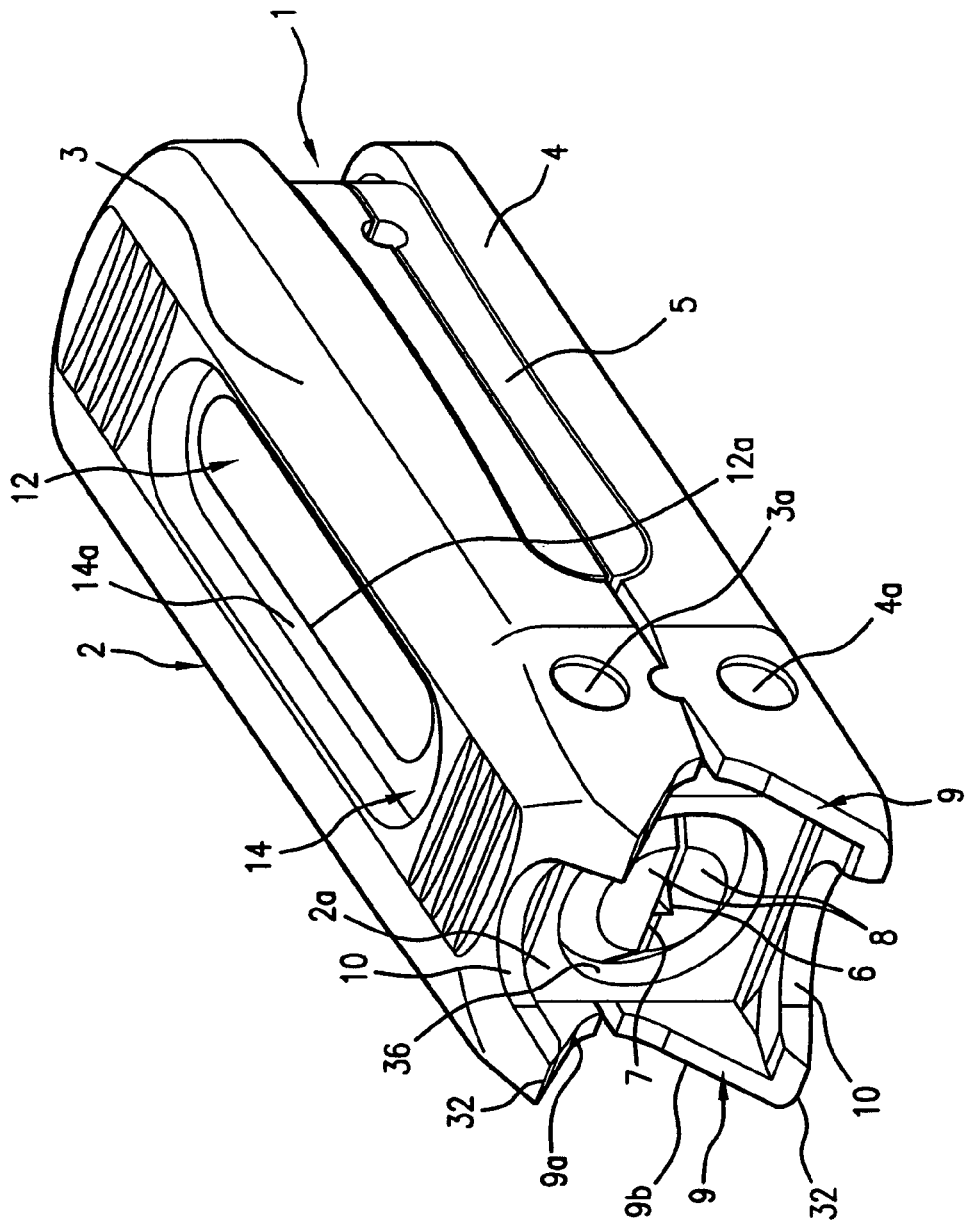
FIG. 1 is a rear perspective view of the flat cable insulation stripping tool of the present invention when in the fully closed position.
Figure 2:
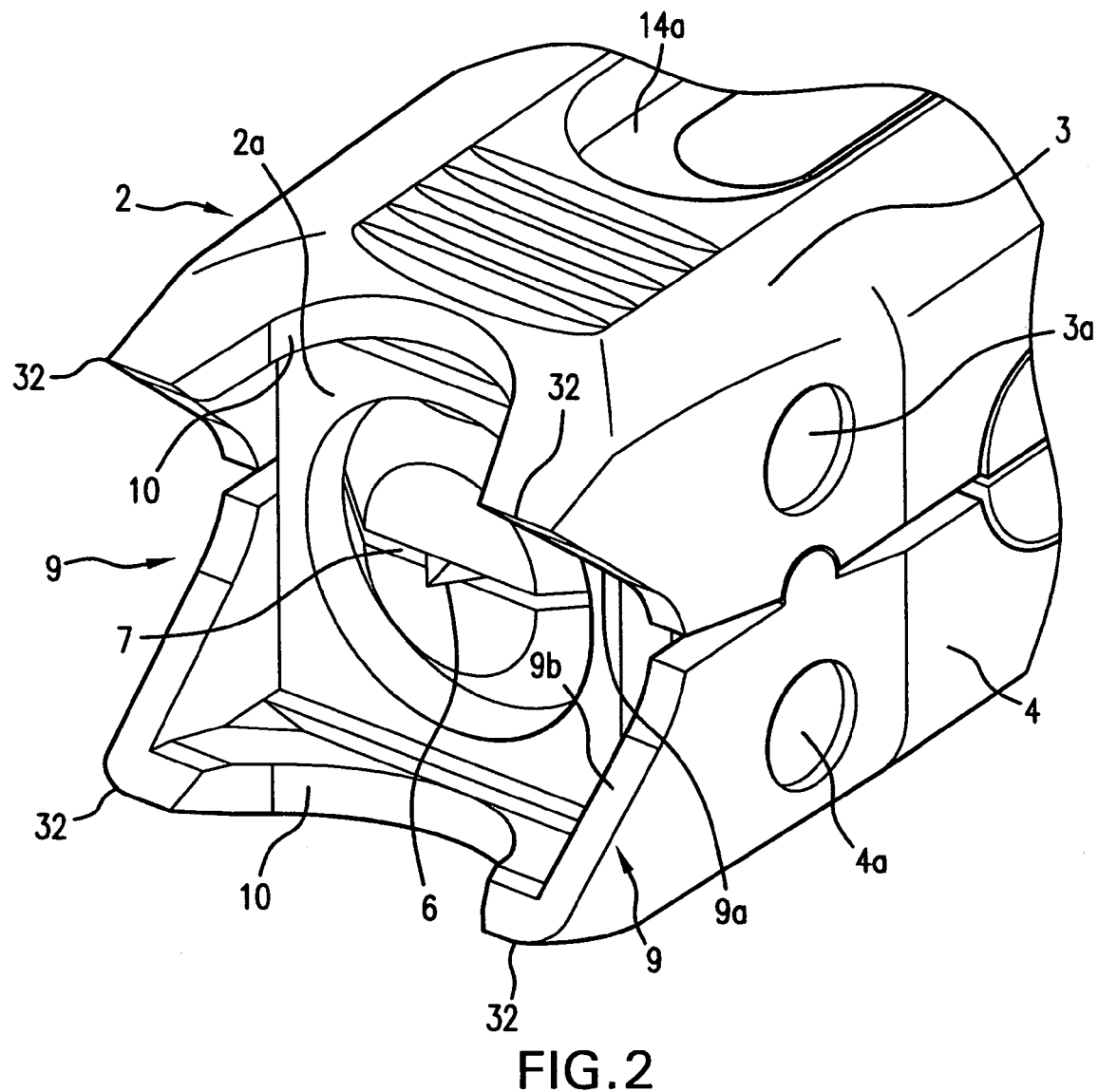
FIG. 2 is an enlargement of the front end portion of the tool of FIG. 1.
Figure 3:
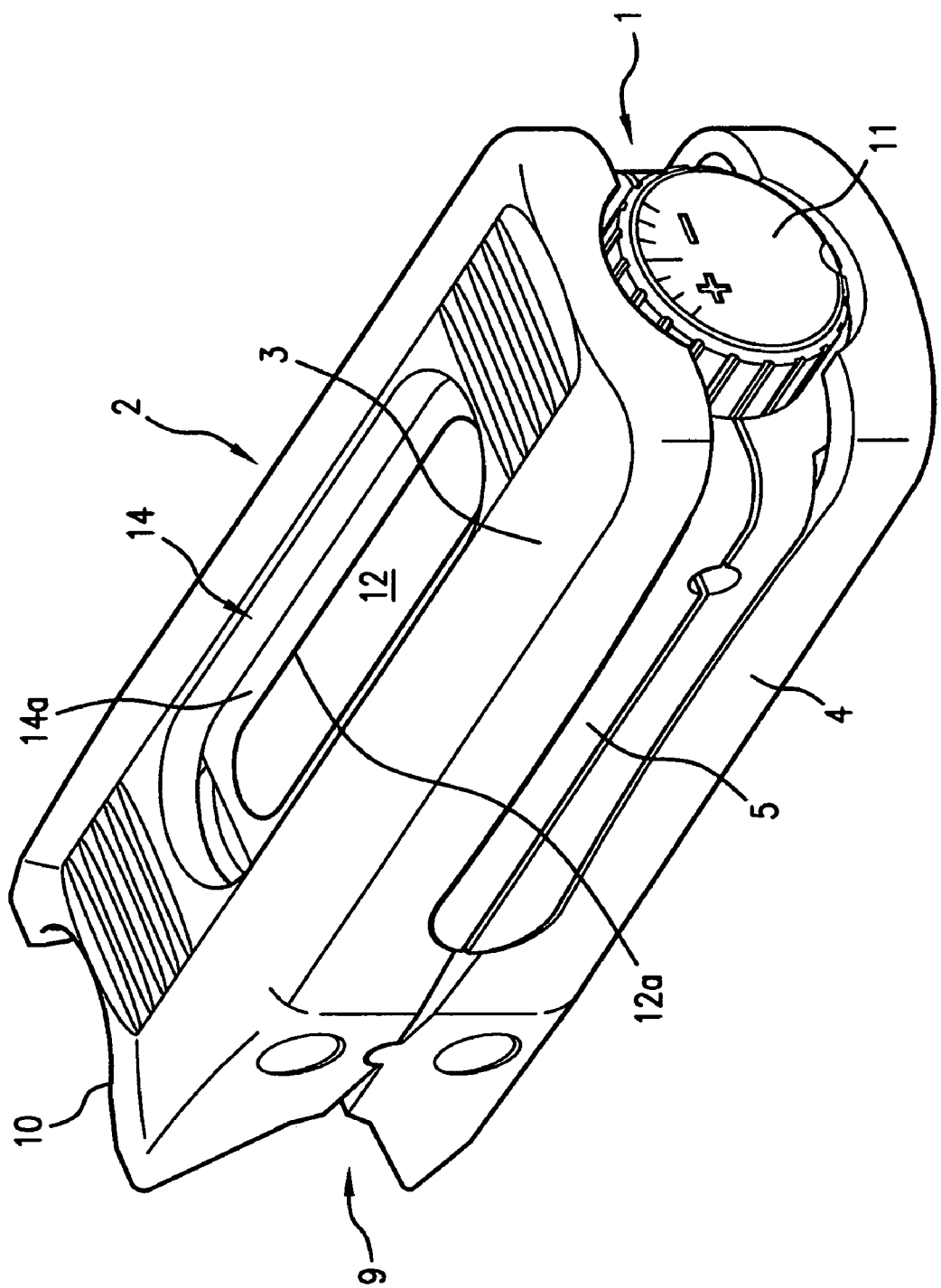
FIG. 3 is a front perspective view of the invention of FIG. 1 with the knife holder means contained within the clamping means.
Figure 4:
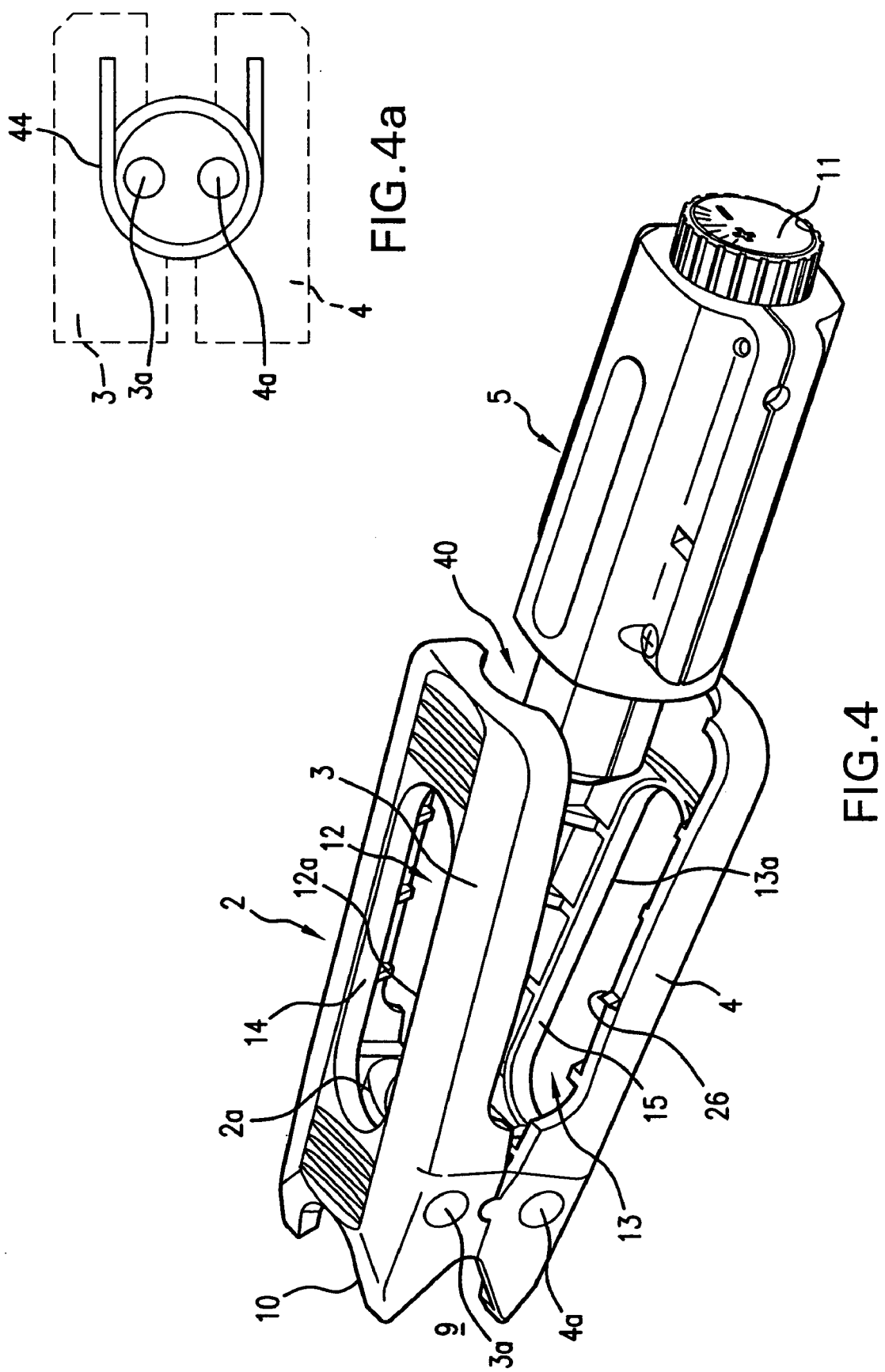
FIG. 4 is a corresponding perspective view with the knife holder means partially removed from the chamber contained within the clamping means.
Figure 5:
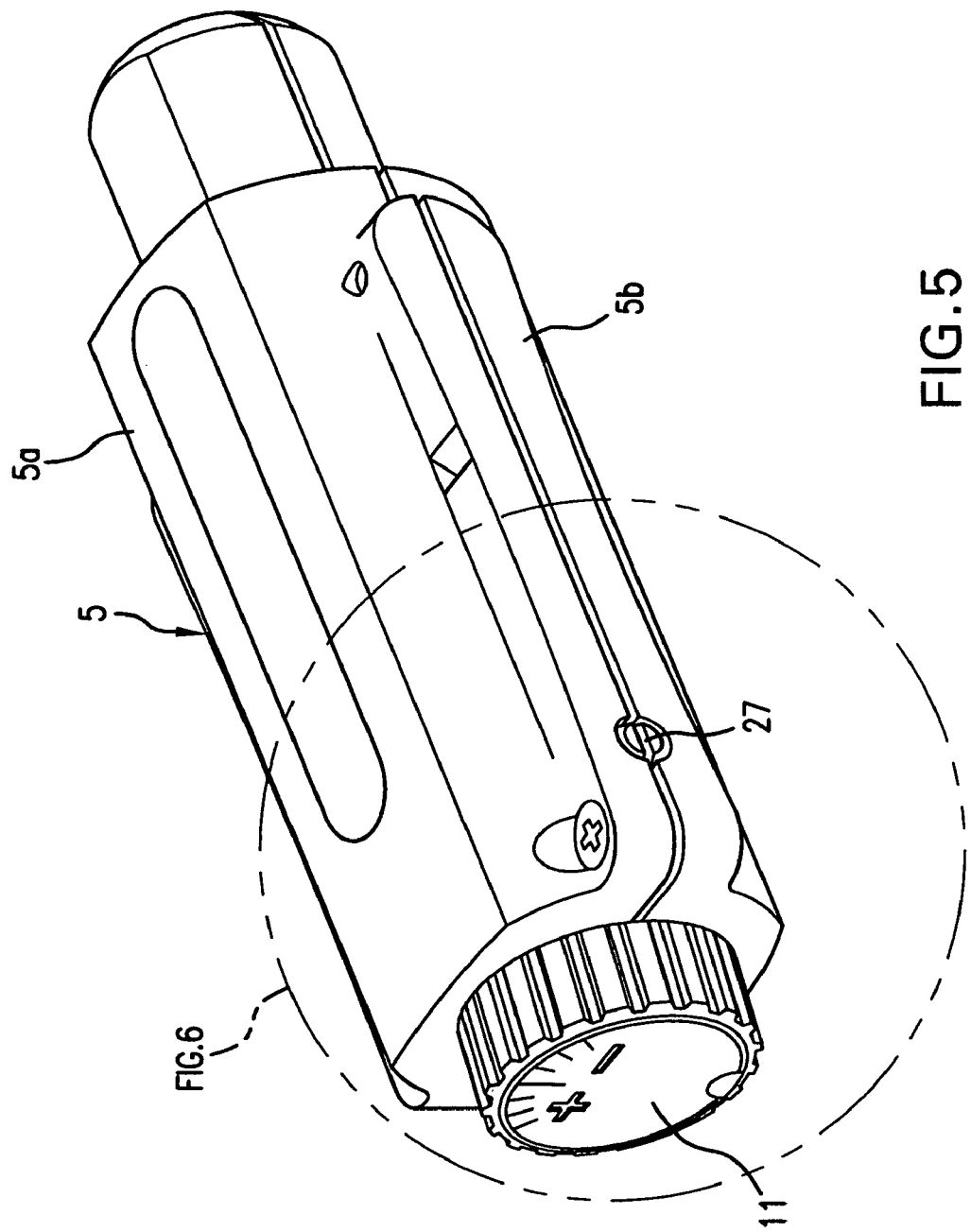
FIG. 5 is a front perspective view of the knife holder means.

Referring first more particularly to FIGS. 1 and 2, the flat cable stripping tool 1 of the present invention includes clamping jaw means 2 having a pair of clamping jaws 3 and 4 pivotally connected at one end to a clamping jaw body member 2a by pivot means 3a and 4a, respectively. As will be described in greater detail below, a chamber 40 (FIG. 4) is defined within the clamping jaw means for receiving a knife holder 5 which is provided at one end with a cutting knife 6 having a cutting blade 6a. The end of the knife holder 5 carrying the cutting knife 6 extends through an opening 32 contained in an end wall of the clamping jaw body portion 2a. As shown in FIG. 4a, the clamping jaws 3 and 4 are normally biased together toward the closed condition by helical compression spring means 44. In accordance with a characterizing feature of the present invention, the clamping jaws 3 and 4 are provided with elongated longitudinally-extending guide bores 12 and 13 having longitudinally-extending guide edges 12a and 13a, respectively. As will be described in greater detail below, the guide bores 12 and 13 are provided with counter bores 14 and 15, respectively, that define support shelf surfaces 14a and 15a that are spaced from the external surfaces of the clamping jaws. As shown in FIG. 2, the clamping jaws 3 and 4 are provided at a first end with a pair of parallel guide grooves 10 that are contained in the extremities of the clamping jaws 3 and 4, respectively. Furthermore, orthogonally arranged to the first guide grooves 10 are a second pair of bifurcated guide grooves 9 having first and second portions 9a and 9b arranged on the jaw members 3 and 4, respectively. The clamping jaws 3 and 4 terminate in sharp edges 32 which are used for stripping the severed insulation sheathing layer from the cable, as will be described in greater detail below.

Figure 6:
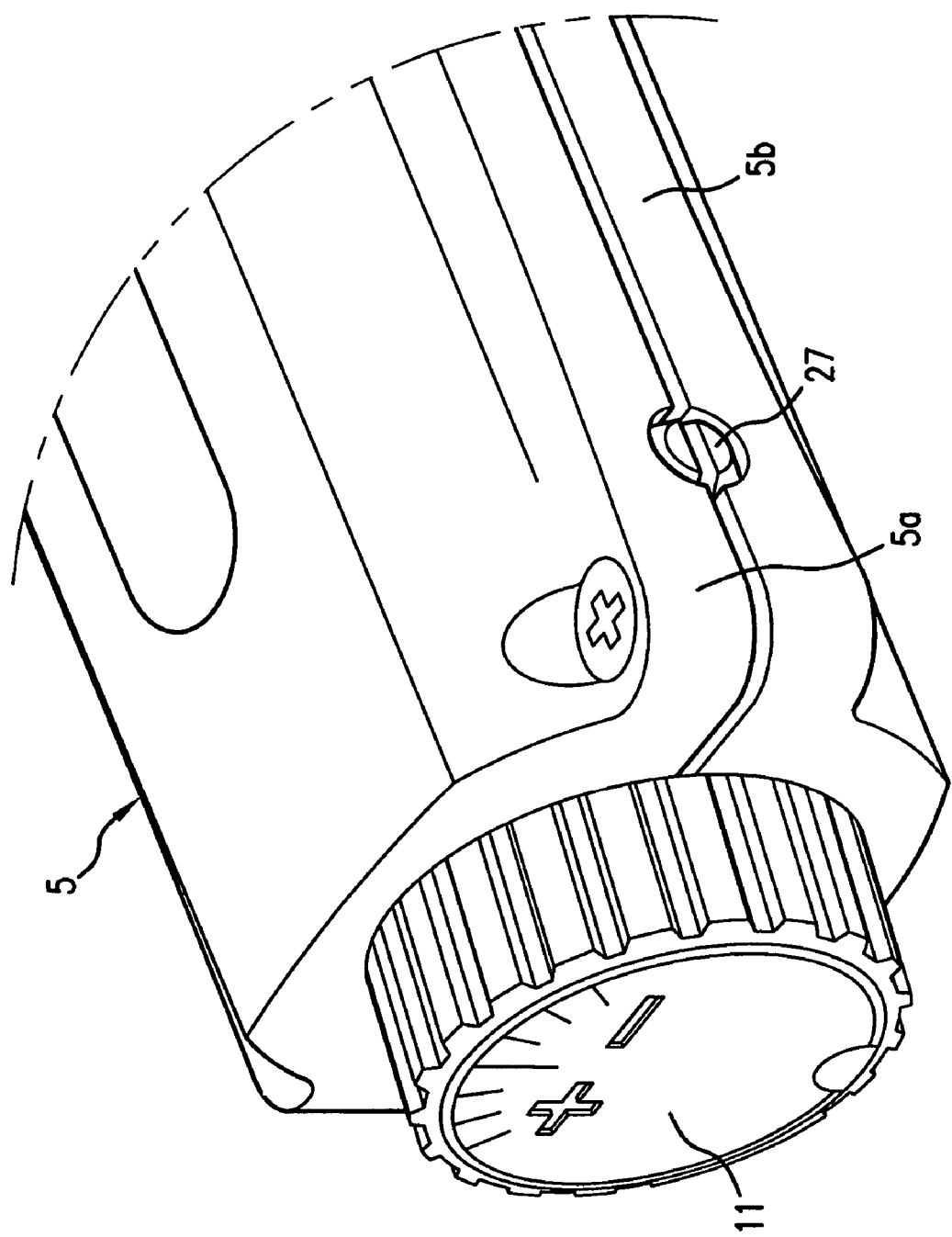
FIG. 6 is an enlarged end view of the knife holder means of FIG. 5.

Referring to FIG. 4, when the clamping jaws 3 and 4 are pivotally displaced apart against the biasing force of the return spring 44, the knife holder 5 may be removed from the chamber 40 contained within the clamping jaw means. As shown in FIG. 4, each clamping jaw 3 and 4 has a generally U-shaped transverse cross section, thereby to define cavities which face each other to define in the jaw clamping means a storage chamber 40 for receiving the knife holder 5. At its forward end, the knife holder means includes the knob portion 11 of a tubular support body 19 (FIG. 11) which is rotated relative to the housing 5 of the knife holder means to adjust the depth of the cut of the knife blade edge 6a, as indicted by the plus and minus indicia on the know 11. A safety screw 27 (FIG. 6) is provided for locking the knife blade depth control means against movement relative to the housing of the knife holder means 5.

Figure 7:
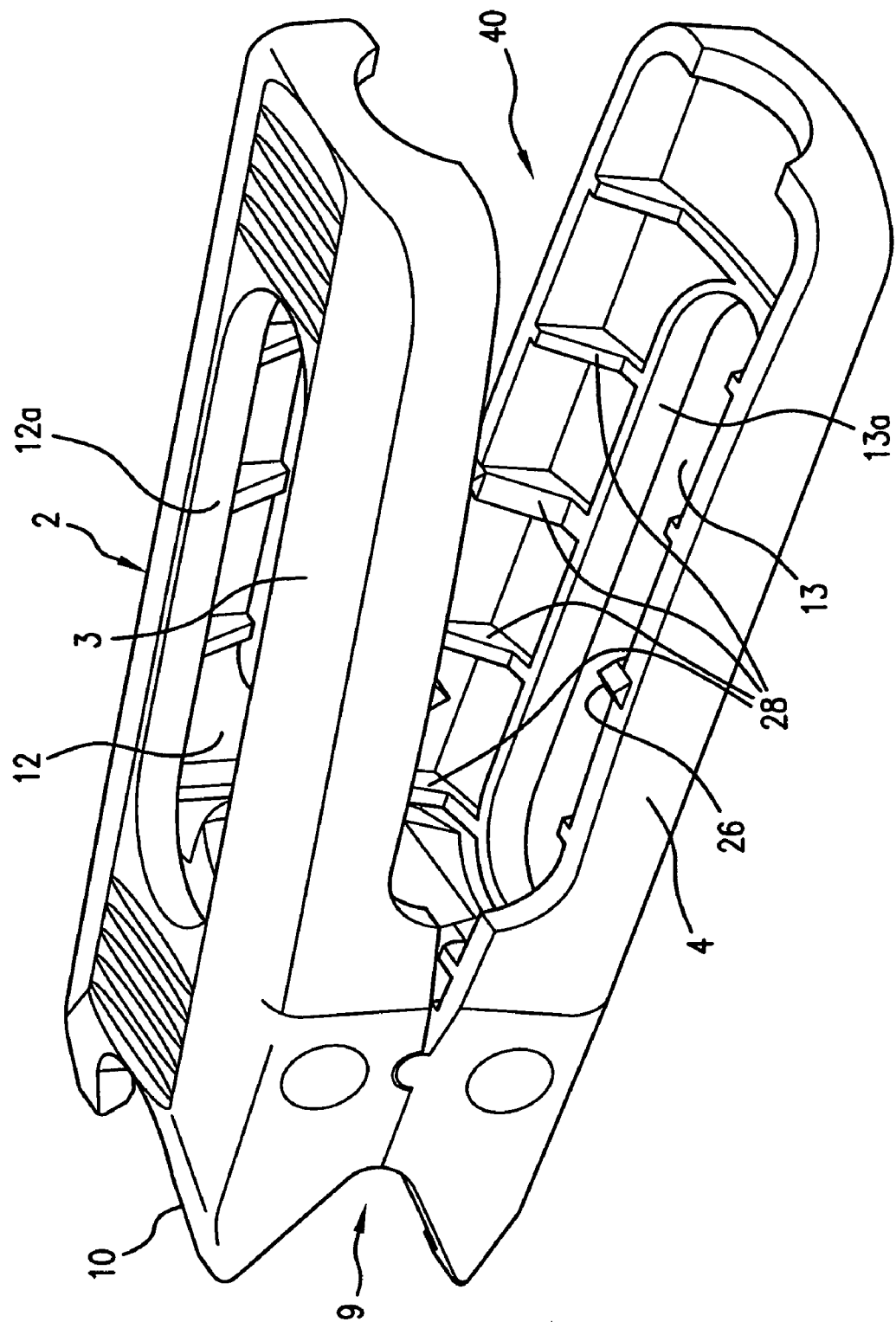
FIG. 7 is a front perspective view of the clamping means when in the open condition.

As shown in FIG. 7, reinforcing triangular braces 28 may be provided within the jaw sections 2 and 3 for strengthening the walls of the cavities form therein. Furthermore, the adjacent edge surfaces of the clamping jaws are provided with locking teeth 26 for locking the jaws to the outer circumferential surface of an insulated flat cable inserted therebetween.

Figure 8:
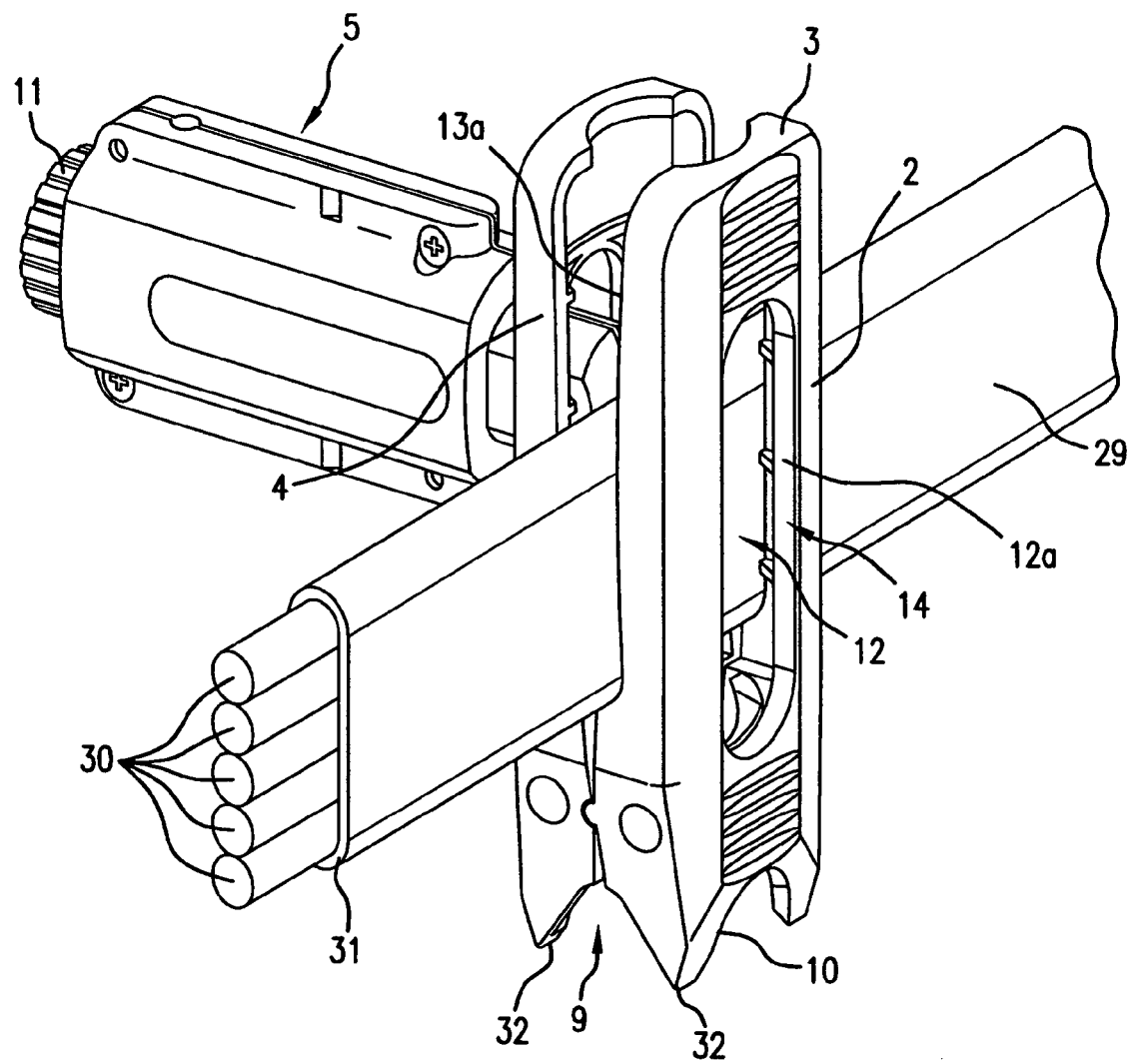
FIGS. 8 and 9 are perspective views illustrating the clamping means clamped to a flat cable both without the guiding and during the guiding of the knife holder means, respectively.
Figure 9:
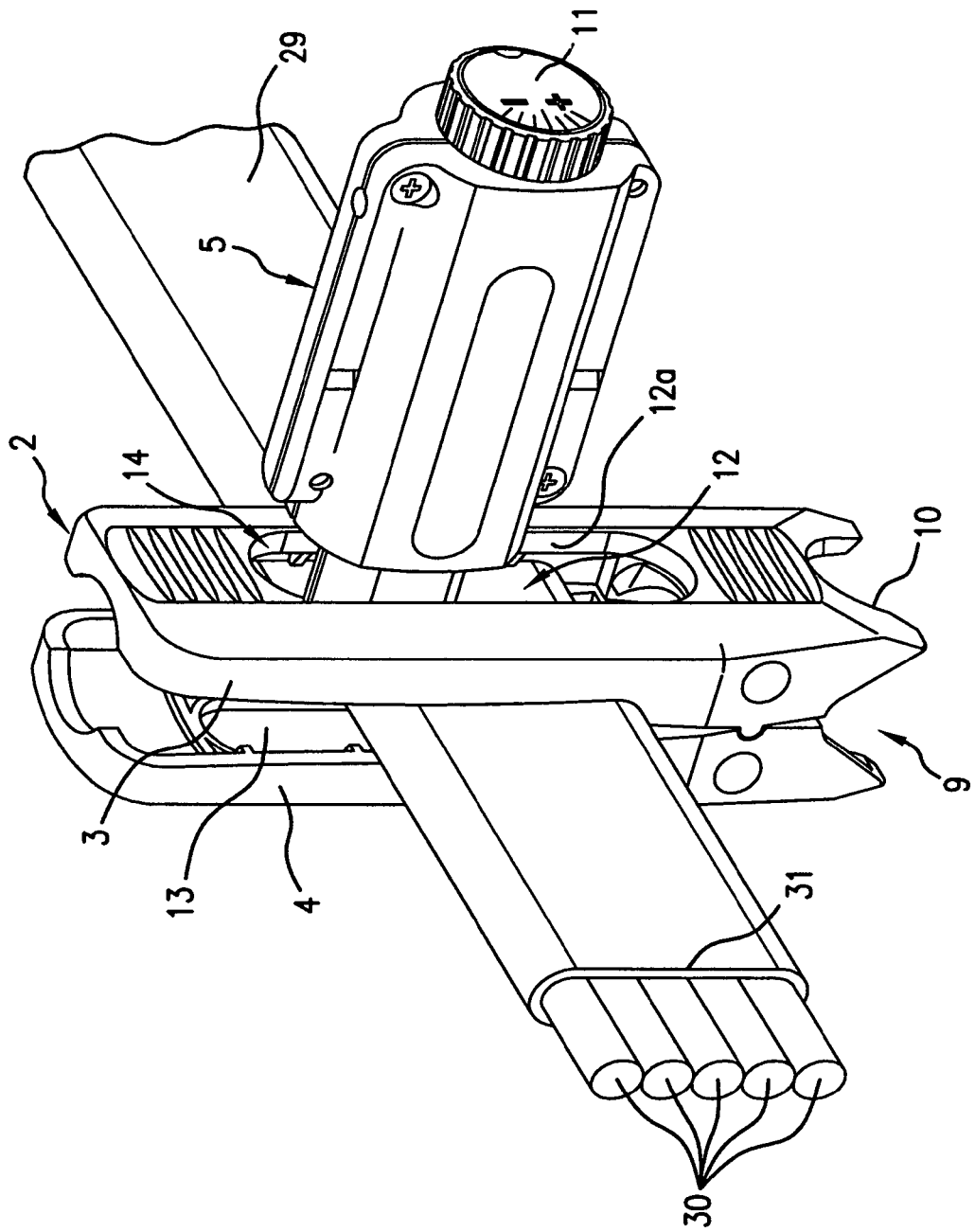

Referring now to FIG. 8, when the knife holder means 5 is removed from the clamping means 2, the clamping means may be opened so that the flat cable 29 is received between the clamping jaws 3 and 4. The flat cable includes a plurality of parallel conductors 30 that are enclosed in an outer insulation sheath 31. As will described in greater detail below, the knife holder means 5 is displaced relative to the guide through bores 12 and 13 contained in the clamping means 2, thereby to cut the insulation sheath 31 at a desired location. As shown in FIG. 8, the knife holder means is guided transversely of the cable by the guide surfaces 13a contained in the clamping jaw 4, and in FIG. 9 the knife holder means 5 is displaced transversely of the cable relative to the elongated guide opening 12 contained in the clamping jaw 3.

Figure 10:
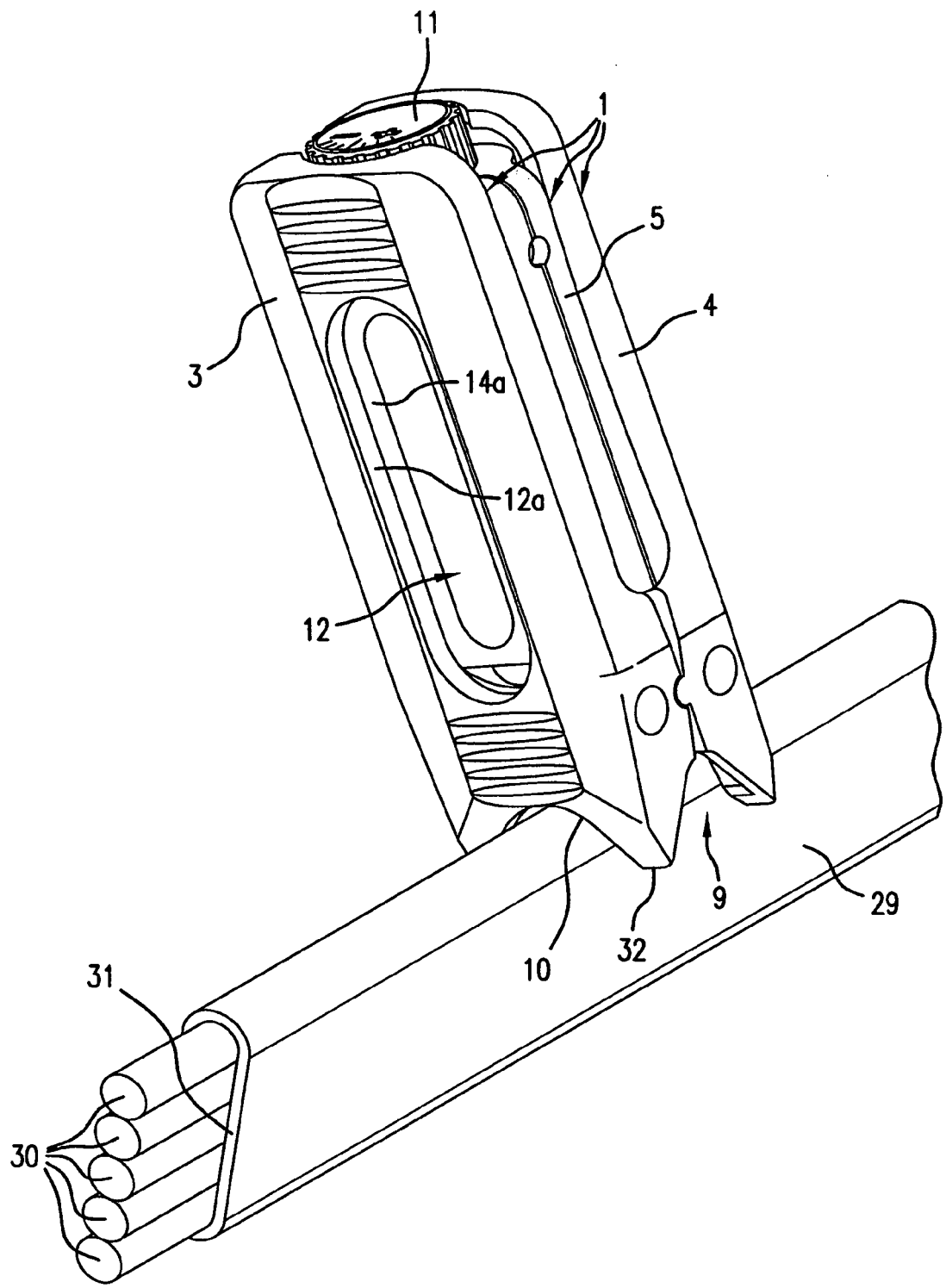
FIG. 10 is a perspective view illustrating the manner in which the clamping means is operated to produce a cut in the flat cable sheath when the knife holder is contained within the clamping means.

As shown in FIG. 10, when the knife holder 5 is inserted into the chamber defined within the clamping means 2, the clamping means may be manually displaced circumferentially relative to the flat cable 29, with the rounded side portion of the cable being received within the first guide grooves 10 contained in the end extremities of the clamping jaws 3 and 4.

Figure 11:
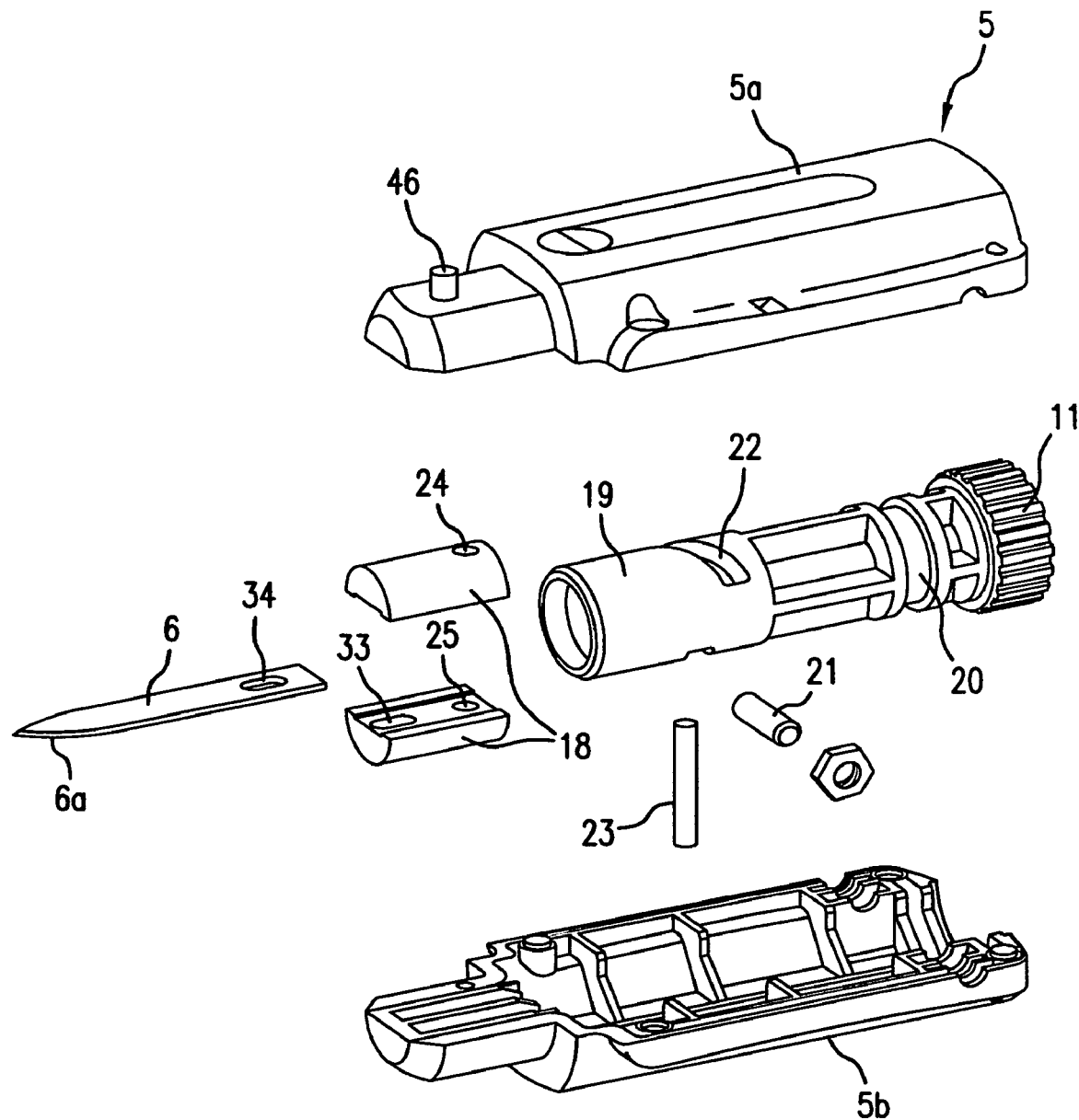
FIG. 11 is an exploded view of the knife holder means.
Figure 12:
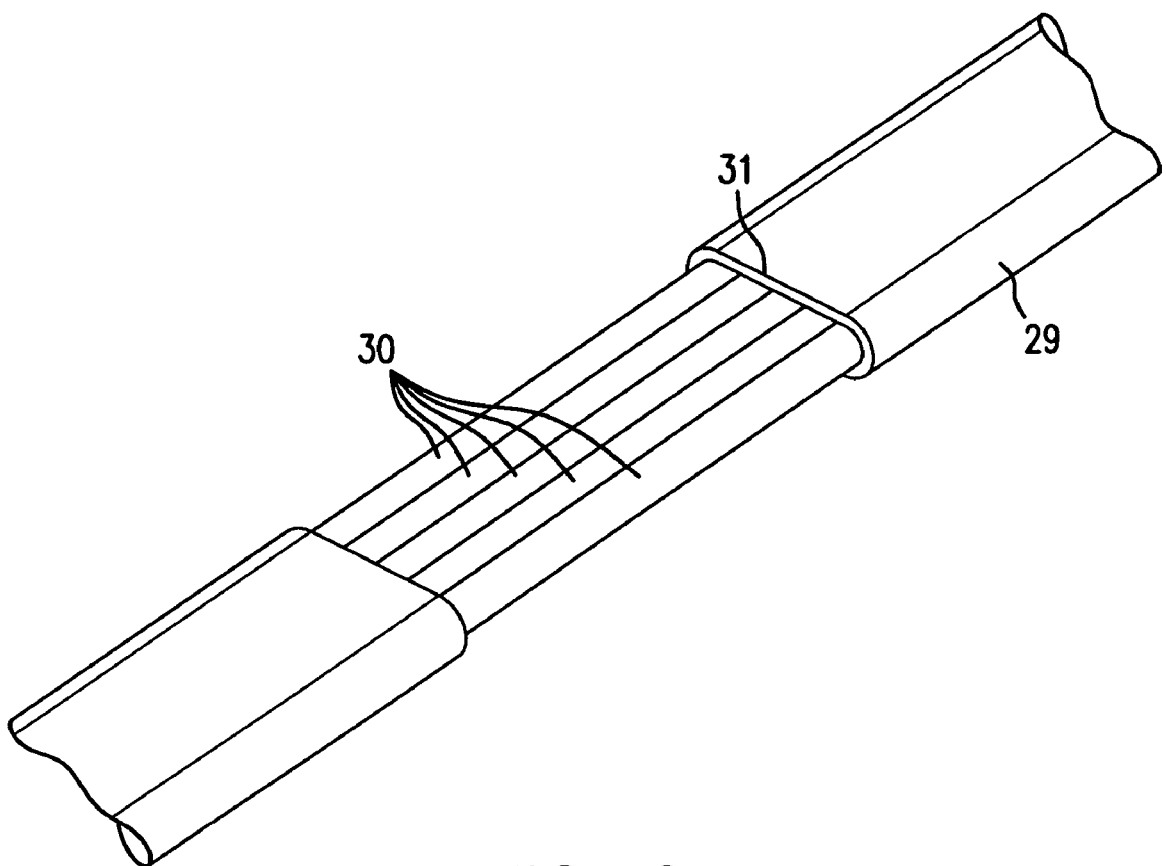
FIG. 12 illustrates a flat cable having an insulation layer that has been partially stripped by the insulation stripping apparatus of the present invention.

Referring to FIG. 11, it will be seen that the knife holder means 5 includes a pair of housing sections 5a and 5b that define a chamber for rotatably receiving a tubular support body 19. Mounted at one end within the tubular support body 19 is a sliding element 18 that is bifurcated to define a pair sections 18a and 18b that contain aligned bores 24 and 25 for receiving a transverse follower pin 23 that extends through the spiral cam groove 22 contained within the tubular support body 19. The knife 6 is prevented from displacement relative to the bifurcated sliding element 18 by means of the projection 33 which extends through a corresponding slot 34 contained in the knife member 6. The follower pin 23 is guided at its ends for longitudinal displacement relative to the tool holder housing 5, whereby upon rotation of the tubular support body 19 by means of the knob 11, the pin 23 is displaced by the spiral cam groove 22 to vary the position of the sliding element 18 and consequently the depth of cut by the cutting edge 6a of the knife 6. Safety pin 21 extends through an opening contained in the knife holder housing for engagement with an annular groove 20 contained in the tubular support body 19, thereby to prevent axial displacement of the tubular body 19 relative to the housing 5. FIG. 12 illustrates the manner in which a portion of the outer insulating sleeve 31 of the flat cable 29 may be removed to expose the insulated conductors 30 of the cable. As shown in the drawings, the insulated conductors 30 of the flat cable are generally coplanar, and the outer surface of the cable has a generally elliptical cross-sectional configuration including flat side walls, and curved edges connected between said flat side walls.

Figure 13A:
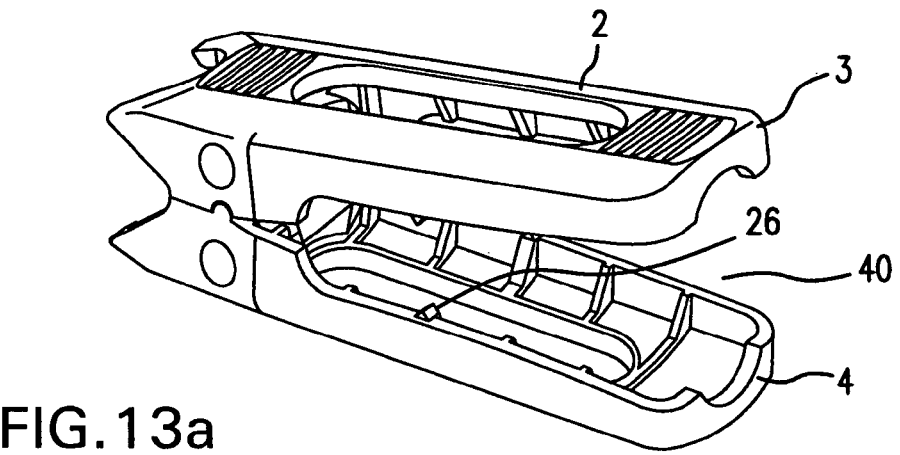
FIGS. 13a-13f illustrate the successive steps for stripping the insulation sheath of a flat cable in accordance with the present invention.
Figure 13B:
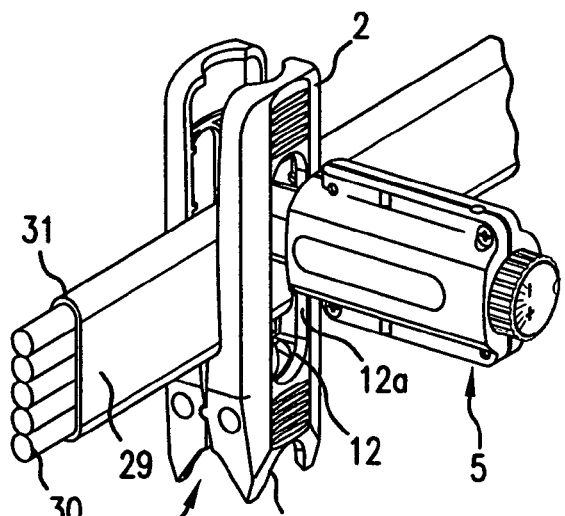
Figure 13C:
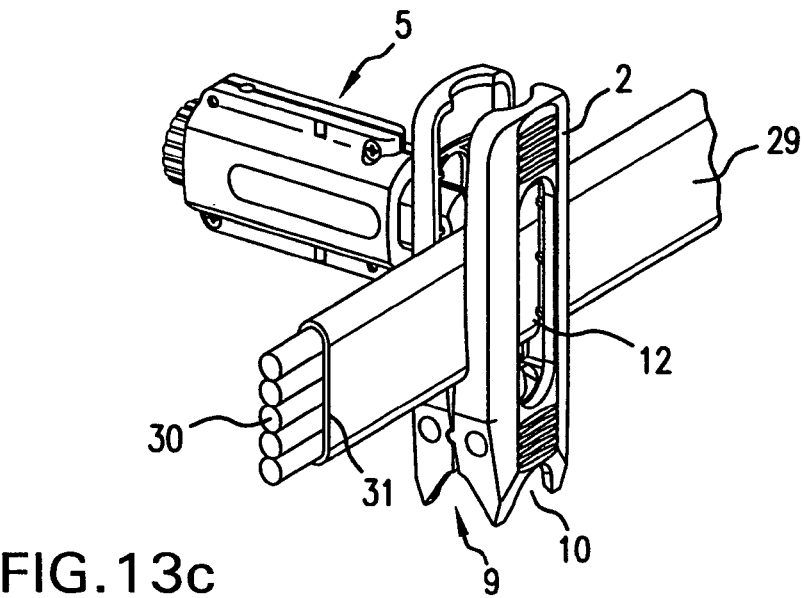
Figure 13D:
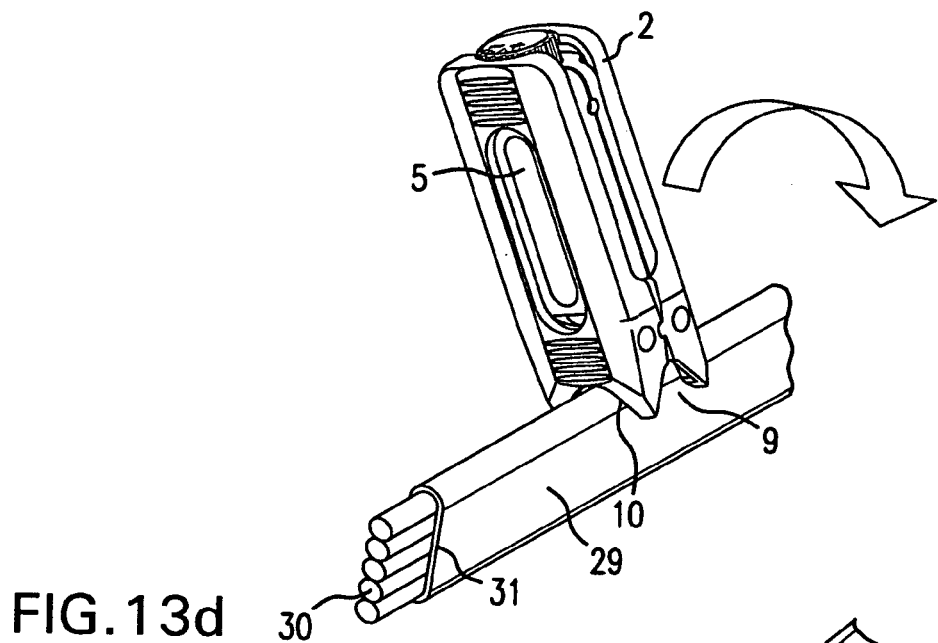
Figure 13E:
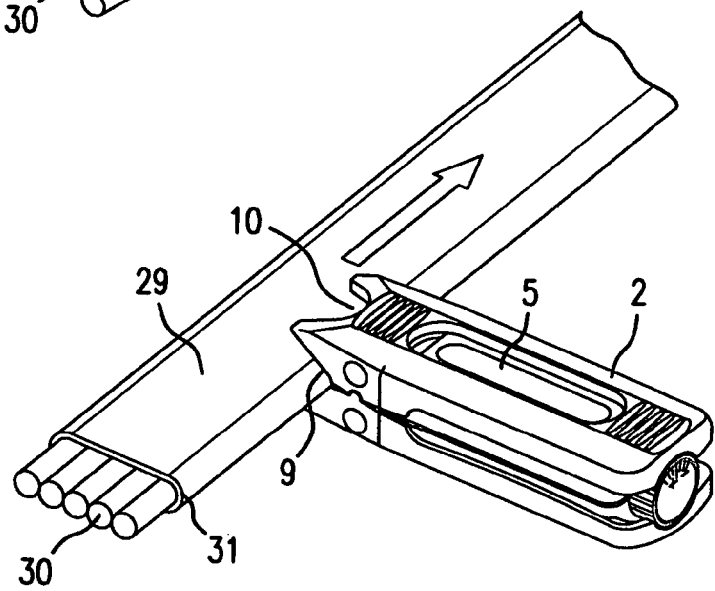
Figure 13F:
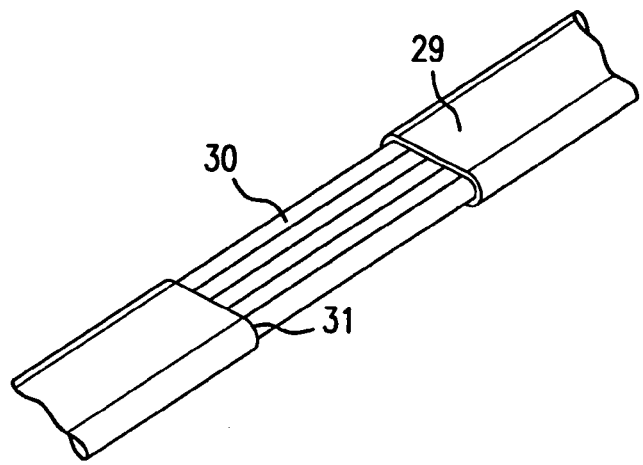

Referring to FIG. 13a, upon opening of the clamping jaw means 2, the cable 29 may be inserted between the jaws as shown in FIG. 13b, whereupon the knife holder 5 is displaced against the guide edge of the guide bore 12 provided within the jaw 3. During this transverse cutting displacement of the knife holder 5 relative to the flat cable, a lateral projection 46 (FIG. 11) rides upon the corresponding support surface 14a defined by the counterbore contained within the clamping jaw 3. The knife holder 5 may then be positioned for engagement by the guide edge 13a of the bore 13 contained in the other clamping jaw 4, whereupon the projection 46 rides upon the support surface 15a defined by the counter bore 15 contained in the second elongated guide bore 13. A second transverse cut is thus formed in the sheath. Referring to FIG. 13d, the tool holder 5 is then inserted within the chamber 40 defined within the clamping means 2, and the edge of the flat cable 29 is inserted within the first grooves 10 contained in the clamping means, as best shown in FIG. 10. The clamping means 2 is then circumferentially displaced relative to the cable in the direction shown by the arrow in FIG. 13d, thereby to provide a circumferential cut in the insulation sheath at the curved edges of the cable. The knife tool is then rotated by 90° to the position shown in FIG. 13e, whereupon the knife holder means is displaced longitudinally of the flat cable 29 as indicated by the arrow, thereby to produce a longitudinal cut in the outer sheath layer 31. The sharp edges 32 at the extremities of the clamping jaws are then used to separate the severed insulation sheathing portion from the cable as shown in FIG. 13f.

While in accordance with the provisions of the Patent Statutes the preferred forms and embodiments of the invention have been illustrated and described, it will be apparent to those skilled in the art that changes may be made without deviating from the invention described above.

What is claimed is:

1. A tool for stripping the outer insulation sheath (29) from a flat cable containing a plurality of parallel generally-coplanar insulated conductors (30) enclosed by said sheath, said cable having a generally elliptical cross-sectional configuration with the outer insulation sheath defining a pair of parallel flat outer side surfaces joined by a pair of curved outer edge surfaces, said cable having a longitudinal axis parallel to the length of the conductors, comprising:
  (a) a knife blade (6) having a cutting edge (6a);
  (b) knife holder means (5) having a first end carrying said knife blade (6) with said cutting edge extending therefrom,
  (c) knife holder guide means (2) including a linear guide edge (12a; 13a);
  (d) clamping means (3; 4) for clamping said guide means onto the cable with said linear guide edge arranged adjacent one of the insulation sheath flat outer surfaces with said linear guide edge extending transversely relative to the cable longitudinal axis;
  (e) said knife blade cutting edge extending from said knife holder means such a distance as to cut the outer insulation sheath transversely of the cable when said knife holder means is displaced in guided relation relative to said linear guide edge; and
  (f) knife cut depth control means for linearly adjusting the position of said knife blade relative to said knife holder means, thereby to control the depth of cut produced by said knife cutting edge in said outer insulation sheath; g) said knife holder means including:
    (1) a hollow sectional tool holder housing (5a, 5b);
    (2) a tubular support body (19) arranged for rotation within said housing;
    (3) a bifurcated sliding member (18) arranged for sliding displacement within one end of said support body;
    (4) means (33, 34) connecting one end of said knife blade with said sliding member with said the knife cutting edge extending outwardly from said sliding member;
    (5) spiral cam and follower means (22, 23) responsive to rotation of said tubular support body within said housing for axially displacing said support body relative to said housing; and
    (6) safety pin means (21) extending through a lateral opening contained in said housing for engaging a circumferential groove (20) contained in said tubular support body, thereby to prevent axial displacement of said tubular support body relative to said housing.

2. An insulating stripping tool as defined in claim 1, and further including set screw means (27) for selectively preventing rotation of said tubular support body within said tool holder housing.

3. An insulating stripping tool as defined in claim 1, wherein said clamping means contains a chamber (40) for receiving said knife holder means; and further wherein at least one of said clamping jaws contains an elongated longitudinally-extending bore (12; 13) defining said guide means, a longitudinal wall of said bore defining said linear guide edge (12a; 12b), said guide bore being dimensioned to receive said knife holder means during the displacement thereof along said cutting guide edge.

4. An insulation stripping tool as defined in claim 3, wherein each of said clamping jaws has a transverse U-shaped cross-sectional configuration, thereby to define a concavity in said clamping jaw, said jaws being arranged with said concavities facing each other, thereby to define said chamber.

5. An insulation stripping tool as defined in claim 4, wherein said clamping means includes an end wall (2a) arranged between said clamping jaw one ends, said end wall containing an opening (36) through which said knife cutting edge extends when said knife holder means is arranged in said chamber; and further wherein said clamping means includes:
 (3) first guide groove means (9, 10) contained in the extremities of said clamping jaw first ends for guiding said clamping means for movement relative to the cable when said knife holder means is arranged in said chamber, thereby to cause said knife cutting edge to cut the cable insulation sheath curved edge surfaces.

6. An insulation stripping tool as defined in claim 5, wherein said guide groove means includes a first pair of parallel guide grooves (10) contained in the end extremities of said clamping jaws, respectively, whereby the clamping means may be displaced circumferentially about the cable to sever the cable sheath.

7. An insulation stripping tool as defined in claim 6, wherein said guide groove means includes a second pair of parallel guide grooves (9) arranged orthogonally to said first pair of guide grooves, each of said second guide grooves being bifurcated and having portions thereof arranged on each of said jaws, respectively, whereby said clamping means may be displaced longitudinally of the cable during the cutting the curved edge portions of the insulation sheath by said knife blade.

8. An insulation stripping tool as defined in claim 7, wherein said second pair of guide grooves terminate at their ends in sharp edges (32) for separating the severed portions of the insulation sheath during the final stripping of the severed sheath from the flat cable.

\* \* \* \* \*